United States Patent
Milne

(10) Patent No.: US 9,734,222 B1
(45) Date of Patent: Aug. 15, 2017

(54) METHODS AND SYSTEMS FOR USING SCRIPT FILES TO OBTAIN, FORMAT AND TRANSPORT DATA

(75) Inventor: Kenneth T. Milne, Glasgow (GB)

(73) Assignee: JPMorgan Chase Bank, N.A., New York, NY (US)

( * ) Notice: Subject to any disclaimer, the term of this patent is extended or adjusted under 35 U.S.C. 154(b) by 2067 days.

(21) Appl. No.: 12/364,632

(22) Filed: Feb. 3, 2009

Related U.S. Application Data

(63) Continuation-in-part of application No. 11/266,949, filed on Nov. 4, 2005, now abandoned, which is a continuation-in-part of application No. 10/889,656, filed on Jul. 12, 2004, now abandoned.

(60) Provisional application No. 60/559,765, filed on Apr. 6, 2004.

(51) Int. Cl.
*G06F 17/30* (2006.01)
*G06F 7/00* (2006.01)

(52) U.S. Cl.
CPC .......... *G06F 17/30569* (2013.01); *G06F 7/00* (2013.01)

(58) Field of Classification Search
CPC ............................. G06F 7/00; G06F 17/30569
USPC ........................................ 715/203, 760, 810
See application file for complete search history.

(56) References Cited

U.S. PATENT DOCUMENTS

| | | |
|---|---|---|
| 4,751,702 A | 6/1988 | Beier et al. |
| 5,027,269 A | 6/1991 | Grant et al. |
| 5,301,320 A | 4/1994 | McAtee et al. |
| 5,325,527 A | 6/1994 | Cwikowski et al. |
| 5,499,371 A | 3/1996 | Henninger et al. |
| 5,539,885 A | 7/1996 | Ono et al. |
| 5,553,235 A | 9/1996 | Chen et al. |
| 5,566,297 A | 10/1996 | Devarakonda |
| 5,594,863 A | 1/1997 | Stiles |
| 5,630,047 A | 5/1997 | Wang |
| 5,673,403 A | 9/1997 | Brown et al. |
| 5,689,698 A | 11/1997 | Jones et al. |
| 5,692,181 A | 11/1997 | Anand et al. |
| 5,708,826 A * | 1/1998 | Ikeda ................ G06F 17/30896 707/E17.006 |
| 5,712,971 A | 1/1998 | Stanfill et al. |

(Continued)

FOREIGN PATENT DOCUMENTS

| | | |
|---|---|---|
| WO | 01/35209 A2 | 5/2001 |
| WO | 01/63529 A1 | 8/2001 |

(Continued)

OTHER PUBLICATIONS

Thomas; Enterprise Javabeans(TM) Technology: Server Component Model for the Java(TM) Platform, java.sun.com, May 2, 1999.

(Continued)

*Primary Examiner* — William Bashore
*Assistant Examiner* — Nathan Shrewsbury
(74) *Attorney, Agent, or Firm* — Goodwin Procter LLP

(57) ABSTRACT

Embodiments of the invention can include a system and method for managing a plurality of data feeds to be loaded into a database. The method includes obtaining a script which specifies a query. The method includes executing the query against a source to extract a result set and consulting the script to determine a format for the data feed. The method also includes converting the result set in accordance with the format to create the data feed and transporting the data feed to be loaded into the database.

19 Claims, 18 Drawing Sheets

(56) References Cited

U.S. PATENT DOCUMENTS

| | | | |
|---|---|---|---|
| 5,734,887 A | 3/1998 | Kingberg et al. | |
| 5,768,119 A | 6/1998 | Havekost et al. | |
| 5,790,809 A | 8/1998 | Holmes | |
| 5,801,689 A | 9/1998 | Huntsman | |
| 5,806,075 A | 9/1998 | Jain et al. | |
| 5,845,292 A | 12/1998 | Bohannon et al. | |
| 5,899,990 A | 5/1999 | Maritzen et al. | |
| 5,926,637 A | 7/1999 | Cline et al. | |
| 5,930,768 A | 7/1999 | Hooban | |
| 5,937,198 A | 8/1999 | Nelson et al. | |
| 5,937,402 A | 8/1999 | Pandit | |
| 5,946,458 A | 8/1999 | Austin et al. | |
| 5,949,412 A | 9/1999 | Huntsman | |
| 5,960,445 A | 9/1999 | Tamori et al. | |
| 5,987,247 A | 11/1999 | Lau | |
| 5,999,179 A | 12/1999 | Kekic et al. | |
| 6,003,075 A | 12/1999 | Arendt et al. | |
| 6,009,274 A | 12/1999 | Fletcher et al. | |
| 6,046,742 A | 4/2000 | Chari | |
| 6,052,456 A | 4/2000 | Huang | |
| 6,101,601 A | 8/2000 | Matthews et al. | |
| 6,148,296 A | 11/2000 | Tabbara | |
| 6,163,776 A | 12/2000 | Periwal | |
| 6,173,316 B1 | 1/2001 | De Boor et al. | |
| 6,184,996 B1 | 2/2001 | Gase | |
| 6,185,613 B1 | 2/2001 | Lawson et al. | |
| 6,195,676 B1 | 2/2001 | Spix et al. | |
| 6,230,319 B1 | 5/2001 | Britt, Jr. et al. | |
| 6,246,410 B1 | 6/2001 | Bergeron et al. | |
| 6,249,877 B1 | 6/2001 | Kawakami et al. | |
| 6,288,790 B1 | 9/2001 | Yellepeddy et al. | |
| 6,289,336 B1 | 9/2001 | Melton et al. | |
| 6,304,871 B1 | 10/2001 | Gajda et al. | |
| 6,314,430 B1 | 11/2001 | Chang | |
| 6,317,738 B1 | 11/2001 | Lohman et al. | |
| 6,332,161 B1 | 12/2001 | Sasson | |
| 6,342,907 B1 | 1/2002 | Petty et al. | |
| 6,353,820 B1 | 3/2002 | Edwards et al. | |
| 6,363,499 B1 | 3/2002 | Delo et al. | |
| 6,404,445 B1 | 6/2002 | Galea et al. | |
| 6,430,556 B1 | 8/2002 | Goldberg et al. | |
| 6,438,749 B1 | 8/2002 | Chamberlain | |
| 6,442,748 B1 | 8/2002 | Bowman-Amuah | |
| 6,453,127 B2 | 9/2002 | Wood et al. | |
| 6,463,343 B1 | 10/2002 | Emens et al. | |
| 6,470,384 B1 | 10/2002 | O'Brian et al. | |
| 6,473,786 B1 | 10/2002 | Scouras et al. | |
| 6,476,828 B1 | 11/2002 | Burkett et al. | |
| 6,477,580 B1 | 11/2002 | Bowman-Amuah | |
| 6,477,590 B1 | 11/2002 | Habusha et al. | |
| 6,484,310 B1 | 11/2002 | Przybylski et al. | |
| 6,502,207 B1 | 12/2002 | Itoh et al. | |
| 6,505,238 B1 | 1/2003 | Tran | |
| 6,518,983 B1 | 2/2003 | Grohmann et al. | |
| 6,546,419 B1 | 4/2003 | Humpleman | |
| 6,557,039 B1 | 4/2003 | Leong et al. | |
| 6,571,282 B1 | 5/2003 | Bowman-Amuah | |
| 6,574,630 B1* | 6/2003 | Augustine | G06Q 10/109 |
| 6,578,068 B1 | 6/2003 | Bowman-Amuah | |
| 6,584,497 B1 | 6/2003 | Case et al. | |
| 6,590,587 B1 | 7/2003 | Wichelman et al. | |
| 6,615,258 B1 | 9/2003 | Barry et al. | |
| 6,643,679 B1 | 11/2003 | Erickson et al. | |
| 6,654,784 B1 | 11/2003 | Wei | |
| 6,657,625 B1 | 12/2003 | Chik et al. | |
| 6,675,228 B1 | 1/2004 | Bahrs et al. | |
| 6,961,330 B1* | 11/2005 | Cattan et al. | 370/352 |
| 7,093,198 B1 | 8/2006 | Paatero et al. | |
| 7,721,265 B1* | 5/2010 | Xu et al. | 717/127 |
| 8,275,740 B1* | 9/2012 | McKeny | G06F 7/00 707/603 |
| 8,731,972 B1* | 5/2014 | Wolf | G06Q 30/0201 705/1.1 |
| 2001/0020255 A1 | 9/2001 | Hofmann et al. | |
| 2001/0044794 A1* | 11/2001 | Nasr | G06F 17/30569 |
| 2002/0010867 A1 | 1/2002 | Schaefer et al. | |
| 2002/0026461 A1* | 2/2002 | Kutay et al. | 707/523 |
| 2002/0046239 A1 | 4/2002 | Stawikowski et al. | |
| 2002/0062475 A1 | 5/2002 | Iborra et al. | |
| 2002/0069192 A1 | 6/2002 | Aegerter | |
| 2002/0103835 A1 | 8/2002 | Kearney | |
| 2002/0109718 A1 | 8/2002 | Mansour et al. | |
| 2002/0111995 A1 | 8/2002 | Mansour et al. | |
| 2002/0111999 A1 | 8/2002 | Andersson | |
| 2002/0120685 A1 | 8/2002 | Srivastava et al. | |
| 2002/0124113 A1 | 9/2002 | Gargya et al. | |
| 2002/0129096 A1 | 9/2002 | Mansour et al. | |
| 2002/0143721 A1 | 10/2002 | Charlet et al. | |
| 2002/0143819 A1 | 10/2002 | Han et al. | |
| 2002/0152244 A1 | 10/2002 | Dean et al. | |
| 2002/0172367 A1* | 11/2002 | Mulder | H04L 63/0428 380/277 |
| 2002/0178434 A1 | 11/2002 | Fox et al. | |
| 2002/0188928 A1 | 12/2002 | Szpak et al. | |
| 2002/0196293 A1 | 12/2002 | Suppan et al. | |
| 2003/0007014 A1 | 1/2003 | Suppan et al. | |
| 2003/0028555 A1 | 2/2003 | Young et al. | |
| 2003/0036809 A1 | 2/2003 | Landman et al. | |
| 2003/0037069 A1 | 2/2003 | Davison | |
| 2003/0046317 A1 | 3/2003 | Cseri et al. | |
| 2003/0069907 A1 | 4/2003 | Moreau et al. | |
| 2003/0093574 A1 | 5/2003 | Fablet et al. | |
| 2003/0097383 A1 | 5/2003 | Smirnov et al. | |
| 2003/0097421 A1* | 5/2003 | Wille et al. | 709/217 |
| 2003/0121983 A1 | 7/2003 | Herle | |
| 2003/0137539 A1 | 7/2003 | Dees | |
| 2003/0149749 A1 | 8/2003 | Carlucci et al. | |
| 2003/0149934 A1 | 8/2003 | Worden | |
| 2003/0160813 A1 | 8/2003 | Raju | |
| 2003/0160821 A1 | 8/2003 | Yoon | |
| 2003/0204460 A1 | 10/2003 | Robinson et al. | |
| 2004/0061713 A1 | 4/2004 | Jennings | |
| 2004/0107183 A1 | 6/2004 | Mangan | |
| 2004/0154014 A1 | 8/2004 | Bunger | |
| 2004/0230587 A1 | 11/2004 | Doddington | |
| 2005/0222990 A1* | 10/2005 | Milne | G06F 17/30557 |
| 2006/0173985 A1* | 8/2006 | Moore | G06F 17/3089 709/223 |

FOREIGN PATENT DOCUMENTS

| | | |
|---|---|---|
| WO | 02/46916 A2 | 6/2002 |
| WO | 02/46980 A3 | 6/2002 |
| WO | 03/001373 A1 | 1/2003 |

OTHER PUBLICATIONS

Rennhackkamp; One for the Road: Sybaseæs Adaptive Server Anywhere 6.0, M&T Publishing Inc., Section No. 10, vol. 11, p. 55, ISSN. 1041-5173.

McClanahan; PowerBuilder3.0, M&T Publishing Inc., vol. 6, No. 11, p. 57, ISSN. 1041-5173, Oct. 1993.

Unknown; Conjuring Up Com Through Scripting, p. 14, Jul. 2000. Quantum SPC/DC Script File (.TDF) Definition Instruction Guide, ASI Data Myte Inc., Version 2.4, p. 2-14.

Myers; Scripting Graphical Applications by Demonstration, Human Computer Interaction Institute, Carnegie Mellon University, www.cs.cmu.edu/bam, p. 1-8, Apr. 1998.

Ousterhoust; Scripting Higher Level Programming for the 21st Century, Sun Microsystems Laboratories, Draft #2, p. 1-14, May 10, 1997.

Dolev, et al.; An Integrated Architecture for the Scalable Delivery of Semi-Dynamic Web Content, Proceedings of the Seventh International Symposium on Computers and Communications, IEEE, 2002.

Betwixt: Turning Beans Into XML, Apache Software Foundation, Archived Jun. 20, 2002 at <http://web.archive.org/web/20020620000410/http://jakarta.apahce.org.commons/betwixt/22 . p. 1 of 1, Nov. 13, 2005.

(56) References Cited

OTHER PUBLICATIONS

XML Schema Part 0 Primer-W3C Working Draft, W3C, Feb. 2000, Retrieved From the Internet on Nov. 18, 2005 at <http://www.w3.org/tr/2000/wd-xmlschema-0-20000225/>, 42 pages.

Frank M. Carrano, et al.; Frank M. Carrano, et al., Data Abstraction and Problem Solving With C++, Aug. 1998, Addison-Wesley, Chapter 2.

Brodkin; Brodkin, Use XML Data Binding to Do Your Laundry, Retrieved From the Internet on May 19, 2006, Acessed and Printed From From the Internet on May 19, 2006 at http://www.javaworld.com/javaworld/jw-12-2001/jw-1228-jaxb.html.

Walsh, Understanding XML Schemas, Jul. 1, 1999.

Bates, Data Manipulation in Perl, Proc. Computer Science & Stats.: 24th Symposium on the Interface, pp. 456-462, Interface Foundation (J. Newaon, Ed.) 1992.

Tam et al, A Fast and Flexible Framework of Scripting for Web Application Development: A Preliminary Experience Report, Proc. of the First Int'l Conf. on Web Information Systems Engineering, vol. 1 pp. 450-455 (2000).

Bakker et al, Next Generation Service Creation Using XML Scripting Languages, IEEE Int'L Conf. on Communications vol. 4 pp. 2001-2007 (2002).

Roodyn et al, An Architectural Style for Multiple Real-Time Data Feeds, Proc. of the Int'l Conf. on Software Engineering pp. 564-572 (May 16-22, 1999).

\* cited by examiner

```
1    # The database connection and procedure to call
2    *.db.user=eqmis_rw
3    *.db.password=xxxxx
4    *.db.server=PDSSQL_EDGLN1
5    .Moss.proc_to_call={ call get_moss([IN;91;%FEEDDATE%]) }
6    # The type of feed(s)
7    ErebusFeed.FeedNames=Moss
8    ErebusFeed.MossType=FlatFile
9    # The transport method
10   *.TransportMethod=MAIL
11   *.MAILSubject=Moss Settlement Fails
12   *.MAILMessage=CSV File
13   *.MAILRecipient=kenneth.t.milne@jpmorgan.com
14   # The file name and column formats
15   *.FileName=sett_fail
16   *.FileExt=.csv
17   *.FileSeparator=,
18   *.TimestampFormat=LEFT|12| |yyyy-MM-dd
```

Example Script File - Flat File Sent as an e-mail attachment.

Extract from menu definition file:
```xml
<menuItem>
    <name>Ken Test</name>
    <button>
        <name>Current Ref Data</name>
        .....
    </button>
    <button>
        <name>Historic Ref Data</name>
        <request>
            <sql>select * from REFERENCE_DATA_HIST
                 where id_region = %REGION% and dt_bus = '%DATE%'</sql>
            <connection>LondonConnection</connection>
        </request>
        <parameter>
            <param>%REGION%</param>
            <name>Region</name>
            <type>integer</type>
            <width>2</width>
            <tip>enter region</tip>
        </parameter>
        <parameter>
            <param>%DATE%</param>
            <name>Business Date</name>
            <type>date</type>
            <width>10</width>
        </parameter>
        <displayAs>
            <mainTitle>Historic</mainTitle>
            <output>Table</output>
        </displayAs>
    </button>
    <button>
        <name>Run proc</name>
        .....
    </button>
</menuItem>
```

```
<request>
    <sql>select * from REFERENCE_DATA_HIST where id_region = 1 and dt_bus = '20050818'</sql>
    <connection>LondonConnection</connection>
</request>
```

```
<menus>
    <menu>
        <name>Reports</name>
        <menuItem>
            <name>Distribution Fee</name>
            ...
        </menuItem>
        <menuItem>
            <name>XCB Rec</name>
            ...
        </menuItem>
        <menuItem>
            <name>Stop and Start Sample Reconciliation</name>
            ...
        </menuItem>
    </menu>
    <menu>
        <name>Test</name>
        <menuItem>
            <name>Ken Test</name>
            ...
        </menuItem>
        <menu>
            <name>MIS</name>
            <menuItem>
                <name>NTE Coupons</name>
                ...
            </menuItem>
        </menu>
    </menu>
</menus>
```

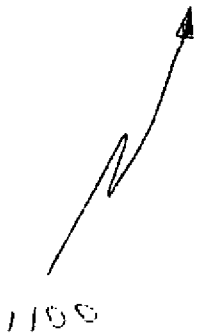

```
<menus>
    <menu>
        <name>Reports</name>
        <menuItem>
            <name>Distribution Fee</name>
            <button>
                <name>Run</name>
                <request>
                    <sql>exec ptp_distribution_fee_report()</sql>
                    <connection>LondonConnection</connection>
                </request>
                <displayAs>
                    <mainTitle>Distribution Fee</mainTitle>
                    <resultTitle>Distribution Fee Full List</resultTitle>
                    <resultTitle>Distribution Feed 30 Days</resultTitle>
                    <resultTitle>Cashflow 30 Days</resultTitle>
                    <output>Table</output>
                </displayAs>
            </button>
        </menuItem>
        ......
</menus>
```

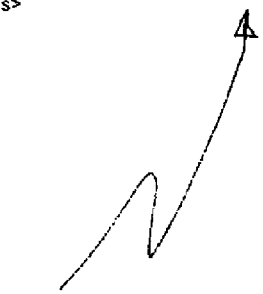

Fig. 17

```
# FX Rate
FxRate.FileName=FX_SPOT
FxRate.FileExt=
FxRate.FileHasHeader=false
.FxRate.sql_to_call1=\
    { call kap_file_load (\
        [IN;1;%@FileName%],\
        [IN;1;%-i%],\
        [IN;4;0],\
        [IN;91;%FEEDDATE%],\
        [IN;93;%FEEDTIME%],\
        [IN;4;1]) }
.FxRate.sql_to_call2=\
    { call kap_fxrate_load (\
        [IN;1;%@FileName%],\
        [IN;1;%-i%],\
        [IN;1;%COL7%],\
        [IN;6;%COL19%],\
        [IN;93;%FEEDTIME%],\
        [IN;4;1]) }
.FxRate.sql_to_call3=\
    { call kap_file_load (\
        [IN;1;%@FileName%],\
        [IN;1;%-i%],\
        [IN;4;1],\
        [IN;91;%FEEDDATE%],\
        [IN;93;%FEEDTIME%],\
        [IN;4;1]) }
```

Example Script File – Flat File loaded via stored procedure

```
Include PtpDbLn

ErebusFeed.FeedNames=SetUp TestHarness
ErebusFeed.SetUpType=Connection
ErebusFeed.TestHarnessType=Scheduler .SetUp.sql_to_call1 = EXEC mkdir -p /home/pyramid/kmilne/test/%FEEDDATE%

*.FeedDateFormat=MMMdd
*.FileDateFormat=MMMdd
*.xDefaultParameter=\
    -property TransportMethod=NONE \
    -property SentDirectory=. \
    -property UserPropertiesDir=/vobs/edg/ext_interfaces/erebus \
    -property ReportsDir=/home/pyramid/kmilne/test/%FEEDDATE%
*.ContinueOnException=true

# Test Standard Trade Message Generation
.ScheduleStandardTrade=Now API \
    -fstdtrd \
    -rNA \
    -property UserPropertiesFile=properties/stdtrd.properties \
    %-x% \
    -property UserPropertiesDir=/home/pyramid/kmilne

# Test Ptp Checks
.SchedulePtpChecks=Now API \
    -fPtpCheck \
    -rLN \
    %-x% \
    -property UserPropertiesFile=properties/PtpCheckln.properties

# Test Hedge Fund Client Feed (Citadel)
.ScheduleHedgeFunds=Now API \
    -fFpMLCitadel \
    -rNA \
    -pESW \
    %-x% \
    -property UserPropertiesFile=properties/FpMLCitadel.properties
```

Example Script File as part of Test Harness

1800

METHODS AND SYSTEMS FOR USING SCRIPT FILES TO OBTAIN, FORMAT AND TRANSPORT DATA

CROSS REFERENCE TO RELATED APPLICATIONS

This application is a Continuation-In-Part of U.S. patent application Ser. No. 11/266,949, filed Nov. 5, 2005, entitled "Methods And Systems For Using Script Files To Obtain, Format And Disseminate Database Information," which is a Continuation-In-Part of U.S. patent application Ser. No. 10/889,656 filed Jul. 12, 2004, which claims the benefit of U.S. Provisional Patent Application Ser. No. 60/559,765, filed on Apr. 6, 2004, all of which applications are hereby incorporated by reference herein.

FIELD OF THE INVENTION

The present invention relates generally to database systems, and, more particularly, to methods and systems for using script files to obtain, format, and disseminate database information.

BACKGROUND OF THE INVENTION

Organizations such as financial institutions are responsible for maintaining a large number of data feeds. These data feeds are typically produced at certain times of the day and delivered in electronic form to various users. An example of a data feed is a spreadsheet file containing information obtained from a database. A typical recipient would be an employee in the organization such as a financial analyst.

Typically, a computer program must be written in a high-level language such as C++ or JAVA for each data feed which is desired. Thus, an end-user who wishes to have information obtained from a database would have a special program written by a programmer that defines the database to access along with the SQL commands to execute. The program would need to interact with various systems to have the information sent to the recipient in the proper format.

Unfortunately, the conventional approach has many drawbacks. Each request for information requires a programmer to code a separate program. Because of the expertise required for this task, it often takes a considerable amount of time to implement even a relatively simple request. Furthermore, this approach leads to a proliferation of programs written in a variety of different languages that can be difficult and expensive to maintain. Accordingly, improved methods and systems for managing a plurality of data feeds are needed.

SUMMARY OF THE INVENTION

The present invention provides improved methods and systems for using script files to obtain, format and disseminate database information.

According to an aspect of the invention, a computer-implemented method for managing a plurality of data feeds is provided. The computer-implemented method for managing a plurality of data feeds includes the steps of obtaining a script, the script for specifying a query and creating a data feed; executing the query against a database to produce a result set; and formatting the result set in accordance with the script to create the data feed. The script preferably also specifies a manner in which the data feed is to be formatted (such as a flat file, a spreadsheet file, an HTML file, an XML file, or a PDF file) and a transport method (such as electronic mail (e-mail), file transfer protocol (FTP), Java Message Service (JMS) or other methods known to one skilled in the art.

Preferably, the script specifies the database name and logon parameters. The query preferably references a procedure that executes SQL commands against the named database. The script can be stored as a text file written in a suitable specification language to provide direction as to obtaining, formatting, and disseminating the desired information.

Embodiments of the invention include a front-end system for managing data feeds to a user from a database. A database server back-end system employs pre-defined scripts to obtain, format, and disseminate the information in the proper, desired format. The front-end system of the present invention is a front-end system that allows the user to more easily select information to be obtained, and to select the type and format of report to be generated. The system provides screens with buttons and input fields for use by the user. Upon the user's request, the front-end system requests a menu definition, such as an XML menu, from the database server, and the front-end system is configured based on the menu definitions. After the user enters in the requested information, the requested information is retrieved from the database server system and displayed in the proper, desired format.

Embodiments of the invention can include a system and method for managing a plurality of data feeds. The method can include requesting, by a front-end system, a menu definition from a back-end system. The menu definition can include an XML menu definition. The method can include receiving, at the front-end system, the menu definition, configuring, at the front-end system, a user interface from the menu definition, and displaying, at the user interface, input fields and/or buttons. The method can also include receiving, at the user interface, inputs from a user, prompting the user to enter necessary parameters, preparing a request at the front-end system, sending the request to the back-end system, processing the request at the back-end system, and sending the request from the front-end system to the back-end system.

Further embodiments of the invention include a computer implemented method of managing data feeds from a source to a database. The method includes the steps of obtaining a script, the script specifying a query for a file, executing the query to search for a file and transporting the file in a given format to be loaded into the database.

Embodiments of the invention can include adding a feature, referred to herein as "Control Feeds," to the script to allow a degree of flow of control within the script file.

Other embodiments of the invention preferably include adding a feature, referred to herein as "Schedule Feeds," to the script to allow part of the script or any feed within in the script to be identified by a schedule.

These and other aspects, features and advantages of the present invention will become apparent from the following detailed description of preferred embodiments, which is to be read in connection with the accompanying drawings.

BRIEF DESCRIPTION OF THE DRAWINGS

FIG. 2 is an exemplary script file for sending a data feed as an e-mail attachment;

FIG. 7 is an exemplary portion of code that defines the functionality of the interface of FIG. 6;

FIG. 11 is an exemplary portion of code that defines the functionality of the interface of FIG. 10;

FIG. 14 is an exemplary portion of code that defines the functionality of the interface of FIG. 10;

FIG. 17 is an exemplary script file for loading a flat file into a database via a stored procedure; and FIG. 18 is an exemplary script file as part of a test harness.

It is to be understood that the attached drawings are for purposes of illustrating the concepts of the invention.

DETAILED DESCRIPTION OF THE INVENTION

Figure 1:
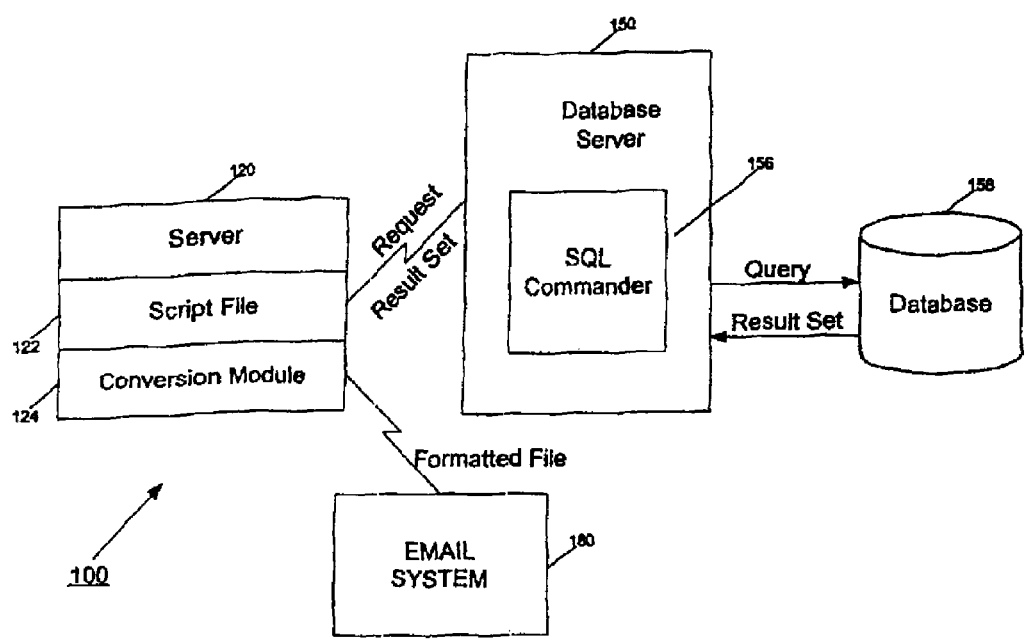
FIG. 1 is a high-level diagram of an exemplary system for disseminating database information.

Referring to FIG. 1, a system for disseminating database information 100 includes a Server 120 that executes a program for accessing a Script File 122 to obtain instructions for creating, formatting and forwarding a data feed. Typically, the Script File 122 contains a series of custom instructions written in a text-based script language. As an example, the Server 120 might be instructed to access a particular database to retrieve specified information and format this information in a particular manner for a designated user.

The Server 120 is operatively coupled to a Database Server 150 such that a plurality of predefined database commands (e.g., SQL commands) is executed. As depicted in FIG. 1, the Database Server 150 includes a SQL Commander 156 for selecting and executing a query against a Database 158. When the Database Server 150 is called, a request for a particular set of SQL commands is received and the SQL Commander 156 selects the pertinent query for the Database 158. The SQL Commander 156 executes the predefined SQL statements, and returns a result set to the Database Server 150. In turn, the Database Server 150 returns the result set to the Server 120.

Once the result set for the particular query is received, the Script File 122 is again consulted to determine the format for the data feed. In general, the result set will be in a form that is not readable. The result set will be converted to a suitable format such as a flat file, an Excel spreadsheet file, a Word file, or a PDF file. In order to convert the result set into the specified format, the Server 120 calls a Conversion Module 124 for this purpose. The Conversion Module 124 could be an off-the-shelf module or one that is specially written. Preferably, the Conversion Module 124 will be implemented in such a way that various different formats are supported and additional ones are easily added.

Referring to FIG. 2, an exemplary script file 122 is illustrated. The script file 122 shown in FIG. 2 instructs the Server 120 to create a flat file and to send the flat file as an e-mail attachment. The Server 120 interfaces with an e-mail system 180 in order to accomplish the task. It is to be appreciated that the script file 122 shown in FIG. 2 is provided for illustrative purposes.

As depicted in FIG. 2, the script file 122 appears as a series of commands in a text file. The syntax for the Script File 122 shown and discussed herein involves a syntax that is close to that of a JAVA properties file. However, it is to be appreciated that the script file could be written in another suitable language so long as it is capable of defining the way in which the data feed is to be created, formatted and disseminated. However, the use of a JAVA properties file for this purpose is a preferred method of creating the Script File 122.

As will be discussed in greater detail, the exemplary Script File 122 shown in FIG. 2 sets forth each of the parameters needed by the Server 120 to create, format and deliver the data feed. Line 1 of this file is a comment since it starts with the number (#) sign. Lines 2 and 3 define the user name and password. Line 4 defines the server name. In this case, it is PDSSQL_EDGLN1. Line 5 defines the procedure to call that is executed by the Database Server 150. Various parameters would typically be passed. Line 6 is another comment. Lines 7 and 8 define the types of feed. In this case, the feed is named "Moss" and is a flat file. Line 9 is comment. Lines 10-14 define the transport method. In this case, the method is e-mail and the message will include the subject line "Moss Settlement Fails" and the body of the message will contain the words "CSV File" The e-mail address of the recipient is also indicated. Line 15 is another comment. Lines 16-19 define the file name and column formats. In this case, the file name will be "sett_fail" and the extension for the file would be ".csv". The file separator would be a comma. Dates would be indicated as left justified in the format yyyy-MM-dd.

Figure 3:
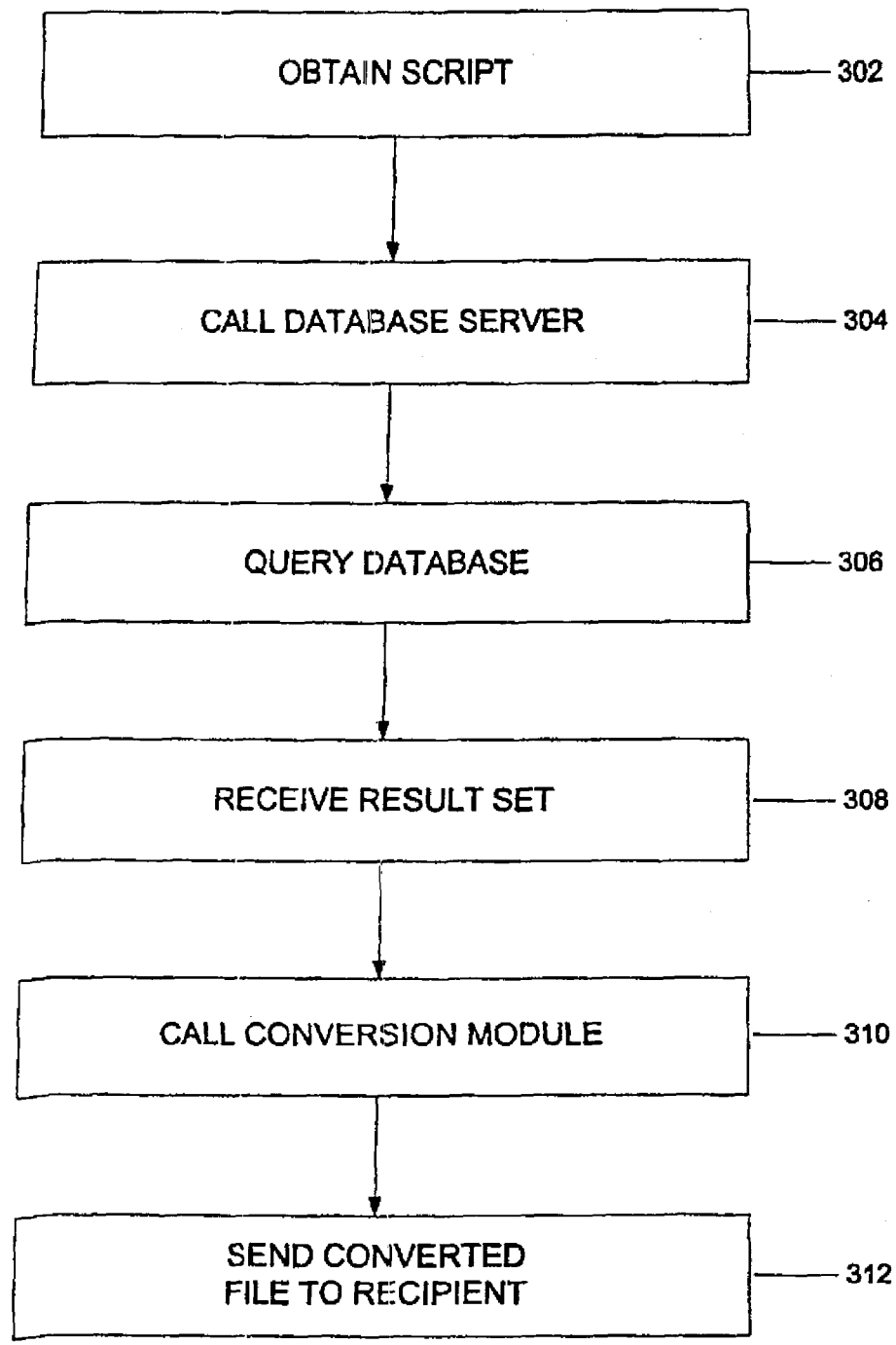
FIG. 3 is an exemplary flow chart outlining a method for disseminating database information.

Referring to FIG. 3, an exemplary method for disseminating database information is illustrated.

First, in step 302, a script file is obtained to determine instructions for creating, formatting and disseminating a data feed. As discussed above, the script file is preferably a JAVA properties file. The script file will typically include the name of the database to access as well as the user id and password information. Next, in step 304, database access is established and a call to a database server is done. The database server will receive information regarding a set of SQL predefined commands to access. In step 306, the database server queries the database with the predefined SQL commands. In step 308, a result set for the particular query is received.

Once the result set is available the script file is consulted to determine the proper format and transport method. In step 310, a conversion module is called to format the result set into the proper format specified by the script file. Finally, in step 312, the converted file is delivered to the recipients indicated in the script file, and processing ends.

The invention will be clarified by the following example.

Example

Properties File

A properties file is located in $HOME/properties. The name should be in the format "<name><region>.properties"

where <name> is the name given to the feed and <region> is ln, ny, tk or blank. (A region is a geographic area where processing is to take place, such as London, New York or Tokyo).

Specifying the Feeds

The invention can invoke one or more different generic data feeds. The feeds to be invoked are specified by the 'FeedNames' property and the type of each feed is specified by the '<name> Type' property where <name> appears as one of the values in the 'FeedNames' property. The feeds and their type enter properties are specified according to the format below.
SystemFeed.FeedNames=<list of names>
SystemFeed.<name>Type=<type>
where
<list of names> is one or more names separated by spaces.
<name> is the name that appears in the <list of names> above.
<type> is the generic type of the feed
(currently FlatFile, HtmlFile, ExcelFile and FileLoader are supported).
A '<name>Type' property must be specified for each name in the <list of names>. The feeds will be started in the order in which they are specified in the <list of names>.

Calling the Stored Procedure

Data feeds of type 'FlatFile', 'HtmlFile', 'ExcelFile' and 'FileLoader' can call a stored procedure. The procedure name and parameters are specified in the properties file as follows. Note the full stop at the start of the line—it denotes that the property name should not have the class name prepended.
<name>.proc_to_call={call<proc>(<list of params>)}
where
<name> is the name of the feed.
<proc> is the name of the stored procedure to be called.
<list of params> is a list of parameters separated by commas.
Each parameter in <list of params> is of the following form.
[<reg>;<type>;<value>]
where
<reg> specifies whether the parameter in an 'IN', 'OUT' or 'INOUT' parameter.
<type> indicates the SQL type of the parameter as defined in java.sql.Types.java.
<value> is one of the values in the Table 1 below.

TABLE 1

| Value | Parameter passed to stored procedure |
| --- | --- |
| hard-coded value | Given value converted to appropriate type |
| %FEEDDATE% | Value of "-d" parameter, or if no "-d" then the current date |
| %NULL% | Null value of the appropriate type |
| %-<single char>% | Value immediately following "-<single char>" in feed parameters |

All "float" and "double" floating-point variables passed to the stored procedure are passed as BigDecimal types to avoid rounding errors, if a particular "-<single char>" parameter is specified in the parameter list but is not given in the feed parameters then a null value of the appropriate type will be passed instead.

Calling SQL

Feeds of type FileLoader' can also call inline SQL. The SQL is specified in the properties file as follows. Note the full stop at the start of the line—it denotes that the property name should not have the class name prepended.
<name>=sql_to_call=<SQL>
Parameter values passed to the feed and % FEEDDATE % can be substituted into the SQL in the same way as they are substituted into stored procedures as described above.

Outputting Result Sets

The file name (or names) in which to output the result set (or sets) returned by the stored procedure are specified as in the properties file that follows. If the "FileName" property has the value "SeparateFiles" then each result set will be written to a separate file, with the first result set returned being written to the file name specified by the "FileName1" property etc.
Either
<name>.FileName=<file name>
or
<name>.FileName=SeparateFiles
<name>.FileName1=<file name 1>
<name>.FileName2=<file name 2><name>.FileName<n>=<file name n>
where
<name> is the name of the feed.
<file name> is any file name with substitutions performed as in the table below.
<n> should match with the number of result sets returned by the stored procedure.
The value of the FileName property may contain certain values which are substituted as shown in Table 2 below.

TABLE 2

| Value in file name | Value that is substituted |
| --- | --- |
| %FEEDDATE% | Value of "-d" parameter, or if no "-d" then the current date |
| %FEEDREGION% | Value of FileRegion property in properties file or none is given, the feed region passed into the feed. |
| %-<single char>% | Value immediately following "-<single char>" in feed parameters |

Configuration Properties

Other properties allow further configuration of the feed as shown in Table 3 below. The property name should have either "*" or "<feed name>." prepended depending on whether it applies to all feeds or a single feed. All properties with string values default to null and all properties with boolean values default to 'false'. Any property values of the form '$<variable>' are assumed to be environment variables and the <value> passed as a system property parameter (i.e. as –D<variable>=<value>) will be substituted.

TABLE 3

| Property | Configures | Value | Applies to |
|---|---|---|---|
| TMinusOne | Changes the feed date to T − 1 | true or false | Flat File<br>Html File<br>Excel File<br>Load File |
| ResultSetSeparator | Text to be output between result sets | Any string | Flat File |
| ResultSetPre | The text to appear before the result set | Any string or HTML | Html File |
| ResultSetPost | The text to appear after the result set | Any string or HTML | Html File |
| ResultSetCaption | The caption for the table the result set appears in | Any HTML | Html File |
| CompletionFileName | The name of a file to be sent after the feed file is sent | Any string | Flat File<br>Html File<br>Excel File |
| FileExt | The file extension to be appended | Any string | Flat File<br>Html File<br>Excel File<br>Load File |
| FileRegion | Populates %FEEDREGION% in the feed file name | Any string | Flat File<br>Html File<br>Excel File<br>Load File |
| ReportsDir | The directory where the file should be written (before/after transporting or copying to sent directory | Any directory | Flat File<br>Html File<br>Excel File<br>Load File |
| TransportMethod | Method by which the file is transported (if more than one method is required they should be separated by whitespace) | FTP, ESITRAN, MAIL (not for Load File) or NONE | Flat File<br>Html File<br>Excel File<br>Load File |
| TransportLater | If set to true the file will be transported by the next feed which has the property unset or set to false. Can be used to send files from separate feeds in the one e-mail. | true or false | Flat File<br>Html File<br>Excel File |
| DateSuffix | Is date to be appended when moved to SENT directory | true or false | Flat File<br>Html File<br>Excel File<br>Load File |
| ShowHeaders | Are column headings to be written as a header row | true or false | Flat File<br>Html File<br>Excel File |
| FileSeparator | The text that separates field values | Any string | FlatFile |
| StartingSeparator | Should a FileSeparator appear at the start of the line | true or false | FlatFile |
| EndingSeparator | Should a FileSeparator appear at the end of the line | true or false | FlatFile |
| FileHeader | The text that appears at the very start of the file. | Any string (with \n as necessary) | FlatFile |
| FileFooter | The text that appears at the very end of the file. | Any string (with \n as necessary) | FlatFile |
| EOLCharacters | The text that terminates a row (usually \n or \n\r) | Any string | FlatFile |
| ShowWhenEmpty | Should a table or sheet appear if it is empty | true or false | Html File<br>Excel File |
| SheetName | The name of the sheet (use SheetName<n> for result set <n> | Any string | Excel File |
| SheetOrder | The order of the sheet (use $, or $ − 1 to indicate the last, last but one sheet | Any number | Excel File |
| FileDateFormat | Date format if %FEEDDATE% is included in the file name | Date format string | FlatFile<br>Html File<br>Excel File<br>Load File |

Properties that are specific to transport and loading methods are shown in Table 4.

TABLE 4

| | |
|---|---|
| FTPServer | The FTP server |
| FTPUser | The FTP user |
| FTPPassword | The FTP user's password |
| FTPDirectory | The directory where the tile should be placed on the FTP server |
| FTPBinaryMode | If set true then use binary mode ftp. Defaults to false. |
| ESITranDir | The directory from where the ESITran route copies files |
| ESITranRoute | The ESITran route identifier |
| MAILSubject | Subject of the mail |
| MAILMessage | The text body of the mail message |
| MAILRecipient | The user to which the mail is to be sent |
| MAILCCList | The CC list of the mail |
| MAILBCCList | The blind CC list of the mail |
| LoadTable | The table loaded via BCP |

TABLE 4-continued

| | |
|---|---|
| LoadServer | The server to be used by BCP |
| Load User | The user for BCP |
| LoadPassword | The password for BCP |
| LoadSeparator | The BCP separator |

Formatting Result Sets

The values returned from the stored procedure result sets can be formatted on a type or column name basis. To format a value in the result set the format property for a particular column is applied first. If this does not exist then the format property of its generic type will be applied. If neither exist the default Java formatting is applied. The format property name should have either "*" or "<feed name>." prepended depending on whether it applies to all feeds or a single feed. Double and numeric types use the BigDecimal class to avoid rounding errors. The property <column name> below is the name of the table column as returned in the result set meta data.

TABLE 5

| Format Property Name | Formats Objects of Type |
|---|---|
| Date | DATE |
| Timestamp | TIMESTAMP |
| Double | DOUBLE |
| Decimal | NUMERIC |
| Integer | INTEGER, SMALLINT |
| String | CHAR, VARCHAR |
| <column name> | As specified in the result set meta data |

All the above properties shown in Table 5 have value fields of the following form. The default field separator character (which is shown below) is "|" but this can be changed by including a property FormatSeparator=<string> if the <format> string needs to contain a "|" itself.
    <property>Format=<justify>|<width>|<pad>|<format>
    where
    <justify> is LEFT, RIGHT to left, right justify the field or IGNORE for no output
    <width> is the width of the field or 0 if the field should not be padded or truncated
    <pad> is the character to use to pad the field if necessary
    <format> is one of the following
      "." for no formatting.
      "Scale:<m>.<n>" for implied decimal places.
      Any of the formats shown in java.text.DecimalFormat.java.
      Any of the formats shown in java.text.SimpleDateFormat.java.

Format strings of the form described in java.text.DecimalFormat.java may also contain the characters "FormatDecimalPlaces". These characters are replaced by the contents of a column in the result set where the name of the column as returned in the result set meta data is "FormatDecimalPlaces". For example to format decimal values to have the appropriate number of decimal places for their currency, return the following in a select statement
    select
      ct_dp_ccy as "FormatDecimal.Places"
    from
      CURRENCY
    and specify a format such as
    "*.DoubleFormat=LEFT|20||#,##0FormatDecimalPlaces" in the properties file.

When formatting in excel format each cell type is set using the type returned for the result set column by default. This allows a user to modify the format as required in Excel. If however all the cells should be created as text cells the following property should be specified.
    ExcelStyleCellFomat=false By default, the column headings output are simply the name of the table column as returned in the result set meta data. This can be changed by the following property.
    <column>ColumnHeading=<heading>
    where
    <column> is the name of the column as returned in the result set meta data.
    <heading> is the text string to be displayed as the column heading.

Substituting Parameter Values in Properties

Parameter values can be substituted into property values by including %-<char>% in the property value. If the parameter has been specified on the command line, then the value of the parameter will replace %-<char>% in the property value. If %-<char>% appears in a property but has not been specified on the command line then the value of the property "<char>DefaultParameter" will be substituted, if one exists. For example consider the parameter "-s" and the properties below.
    *.Prop=Run for %-s %
    *.sDefaultParameter=today If -syesterday is passed as a parameter, the 'Prop' property value will be "Run for yesterday", but if no -s parameter is passed as a parameter, the 'Prop' property value will be "Run for today".

Embodiments of the invention can include a front-end system that allows a user to easily configure specific data requests. The results of the request can be displayed in an appropriate format via the front-end system.

The main purpose of the 'Server' feed type is to allow a database server feed to act as a server for a data driven Web site at a front-end system. The architecture of the web site is designed to ensure that it requires a relatively low amount of maintenance, allowing new reports to be added or existing reports to be modified without changing the front-end. In addition, such a configuration allows multiple instances to be configured in different ways.

The front-end menu structure is specified by the structure of an XML document that contains the menu definitions. Each menu item can supply a menu name and a request to be sent to the back-end server when it is selected as well as information on how to display the data when it is returned by the back-end. If the request requires any parameters to be supplied, then and their name and types can be specified in the menu item definition.

Figure 4:
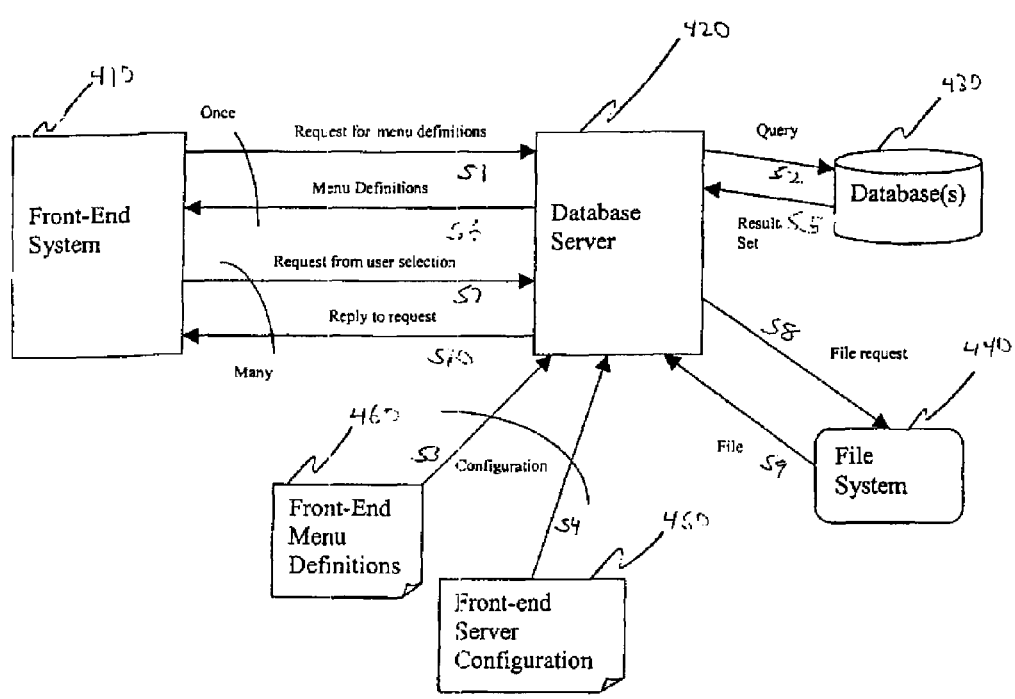
FIG. 4 is an exemplary flow diagram illustrating a method for disseminating database information.

With reference to FIG. 4, there is shown an exemplary system 400 and flow illustrating embodiments of the invention. The system 400 can include a front-end system 410 communicatively coupled to a database server 420. Database server 420 is coupled to database 420. Database server 420 is also coupled to file system 440. Database server 420 is also coupled to front-end menu definitions 460 and front-end server configurations 450.

In use, a front-end system 410 makes a request from the database server 420 for menu definitions, in step S1. Next, the database server 420 retrieves a menu definition from the front-end menu definitions 460, in step S3. In addition, database server 420 retrieves one or more front-end server configuration files 450, in step S4. Database server 420 then sends the requested menu definition to the front-end system, in step S6. Once the menu definition is loaded on the front-end system 410, a user can cause the front-end system 410 to request a user selection from the database server 420, in step S7. Database server 420 can access database 430, in step S2, and retrieve data related to the request, in step S5. Database server 420 can also request0 the desired file from file system 440, in step S8, and retrieves the desired file, in step S9. Next, the database server 420 replies to the user request by forwarding the desired user selection, in step S10.

In some embodiments, the steps of the methods can be performed by one or more software programs operating on a computer having a processor and storage as would be known to those skilled in the art, as informed by the present disclosure. The computer can be one or more personal computers, and/or one or more servers, communicatively coupled via a network, such as an intranet, or the Internet. Alternatively, other computer configurations could be employed, as a matter of application specific design choice, as would be known to one skilled in the art, as informed by the present disclosure. In addition, the computer can be any now known, or later developed computing device, and/or handheld computing device, as would be known to one skilled in the art.

Figure 5:
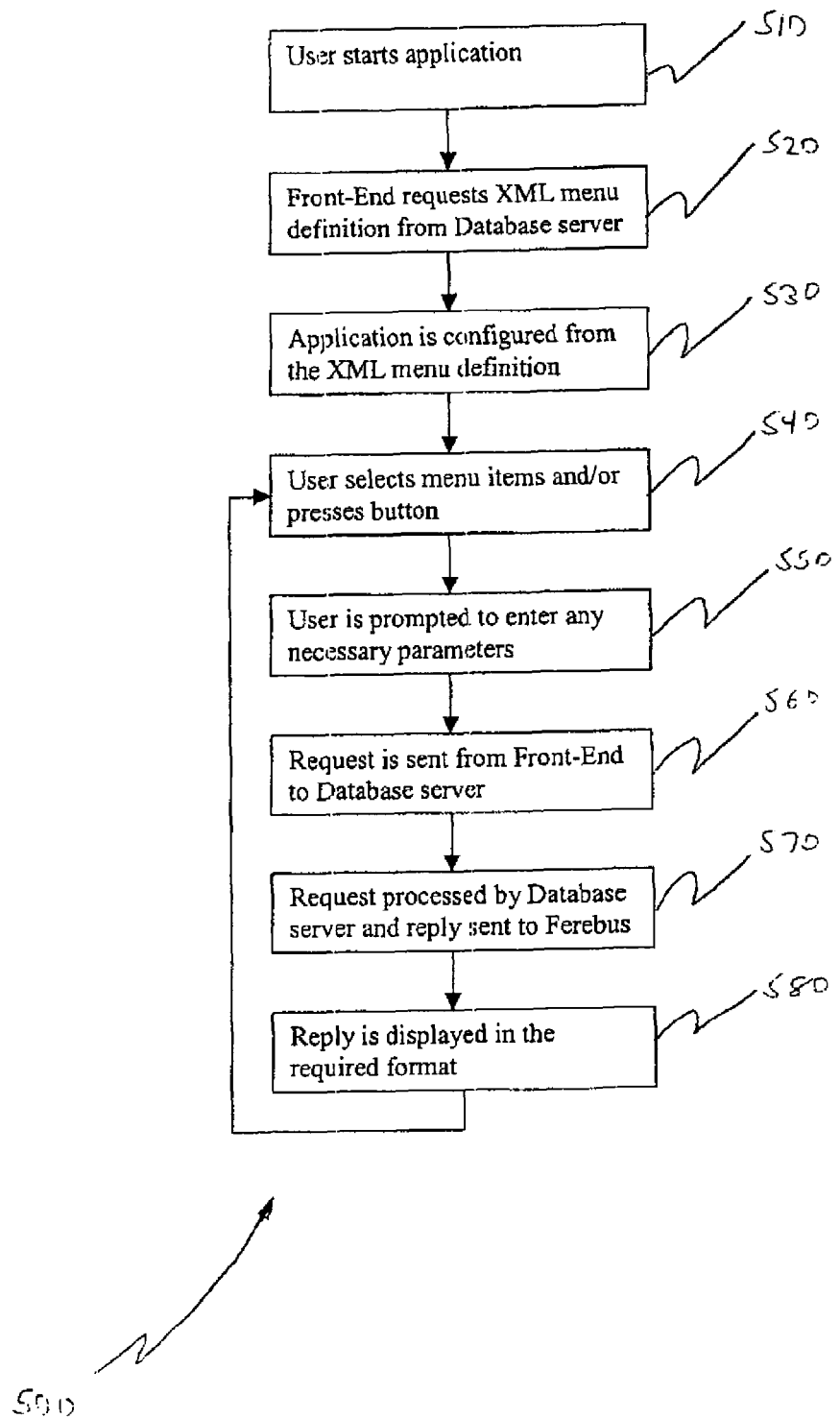
FIG. 5 is an exemplary flow chart illustrating a method for disseminating database information.

FIG. 5 is an exemplary flow chart outlining a method 500 for disseminating database information in accordance with embodiments of the invention. In some embodiments, a user initiates the application, in step 510. Next, the front-end system 410 requests a menu definition from database server 420. In some embodiments, the menu definition can be an XML menu definition. Alternatively, other programming languages can be employed. Next, the application is configured from the menu definition, in step 530. In step 540, the user can select a menu item and/or select a button on the user interface, described in further detail below. Next, a user can be prompted to enter any necessary parameters, in step 550. A request is then sent from the front-end system 410 to the database server 420, in step 560. Next, in step 570, the request is processed by the database server and sent to the front-end system. Finally, a reply is displayed in the required format, in step 580. The user can then select additional menu items or make additional selections via buttons, returning to step 540.

In alternate embodiments, additional steps may be added, certain steps may be excluded, certain steps may be performed multiple times, and/or the steps may be performed in a different order and/or simultaneously.

Figure 6:
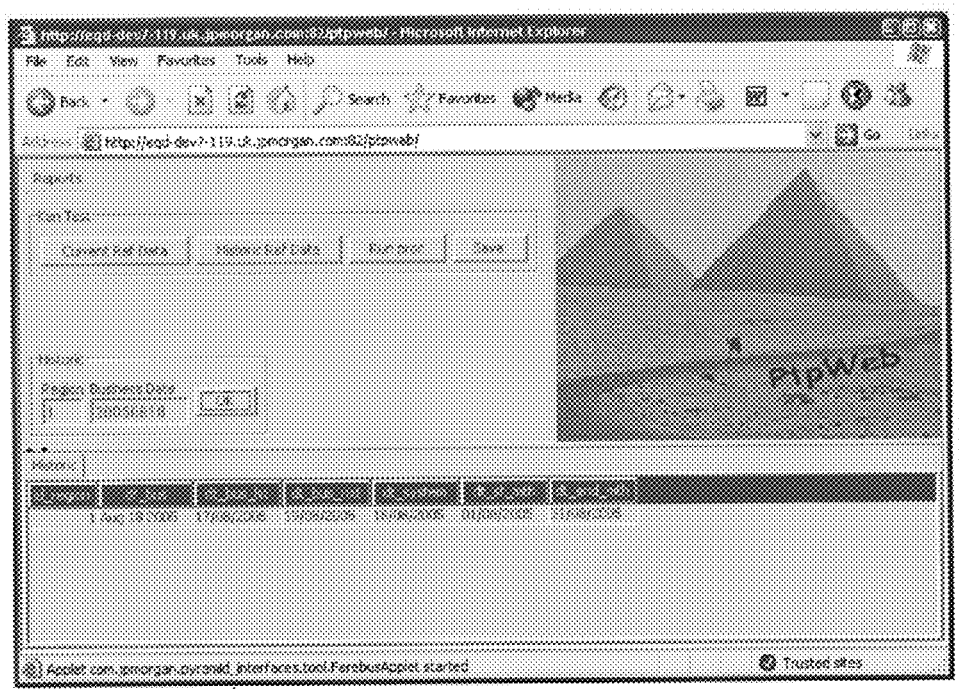
FIG. 6 is an exemplary screen shot of an interface for disseminating database information.

With reference to FIG. 6, there is shown an exemplary screen shot 600 of an interface for disseminating database information, in accordance with embodiments of the invention. Screen 600 is part of an interface accessed by a user to request a certain data feeds. Screen 600 can include user selectors or buttons for requesting current reference data and historic reference data. User buttons for running the process and for saving a configuration can also be included. If historic data is requested, screen 600 can include a historic configuration region including input fields for region, and business date. An "OK" or equivalent button can be included to initiate the retrieval of historic data. Historic data can be displayed including the fields of region ID, business date, last business date, next business date, system date, month start date, and month end date.

In this example, when a user selects the menu item called 'Ken Test' the buttons defined in the <menuItem> tag will appear. The 'Save' button is automatically inserted and allows the user to save the report as a text or. Excel file. Selecting the 'Historic Ref Data' button displays two parameter text boxes which the user can populate before pressing the 'OK' button. When this is done, the parameter values are inserted into the request so the following request is sent to the database server 420. The reply is displayed in a table in the application.

In FIG. 7, an exemplary portion of code 700 describing a menu definition file for the interface screen 600 described above is shown. The menu definition file defines the buttons and input fields described above for interface screen 600.

Figure 8:
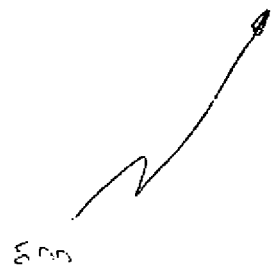
FIG. 8 is an exemplary portion of code that defines the functionality of the interface of FIG. 6.
Figure 9:
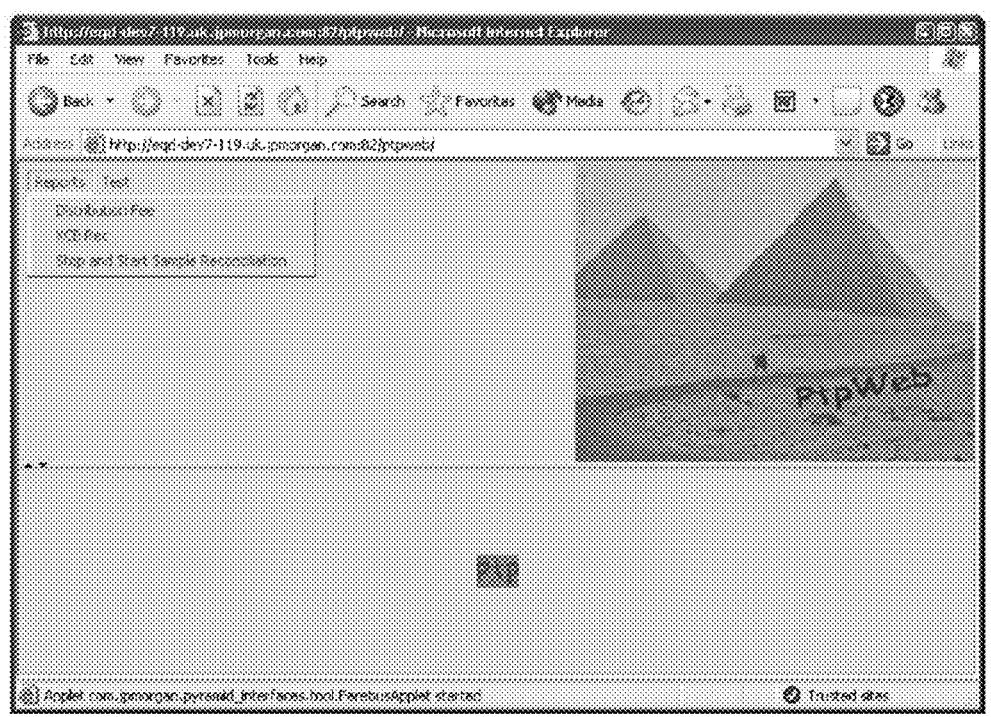
FIG. 9 is an exemplary screen shot of an interface for disseminating database information.

FIG. 8 is an exemplary portion of code 800 defining the format of reply data on interface screen 600, shown in FIG. 6. The code represents a portion of the code portion shown in FIG. 7, with specific values replacing variables. By way of interface screen 900, a user can select "reports," and thereby initiate a cascading menu having selection options for distribution fees, XCB rec, and stopping and starting sample reconciliation.

Figure 10:
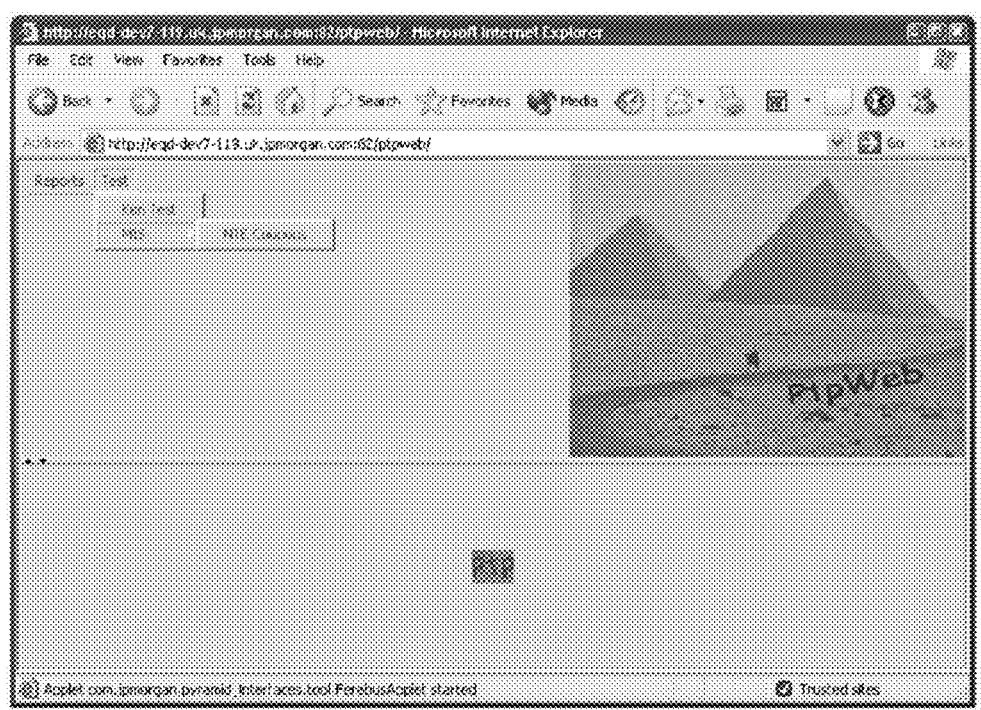
FIG. 10 is an exemplary screen shot of an interface for disseminating database information.

With reference to FIGS. 10 and 11, there is shown an exemplary screen 1000 of an interface in accordance with embodiments of the invention, along with a corresponding code portion 1100 including a menu definition file. By way of interface screen 1000, a user can select a test button.

Figure 12:
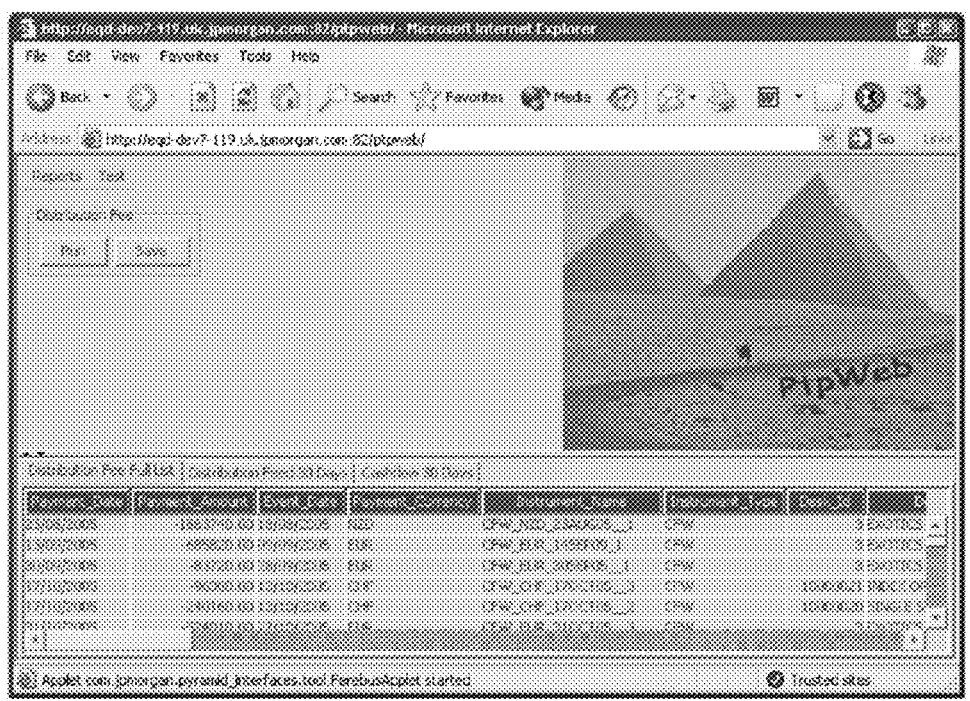
FIG. 12 is an exemplary screen shot of an interface for disseminating database information.
Figure 13:
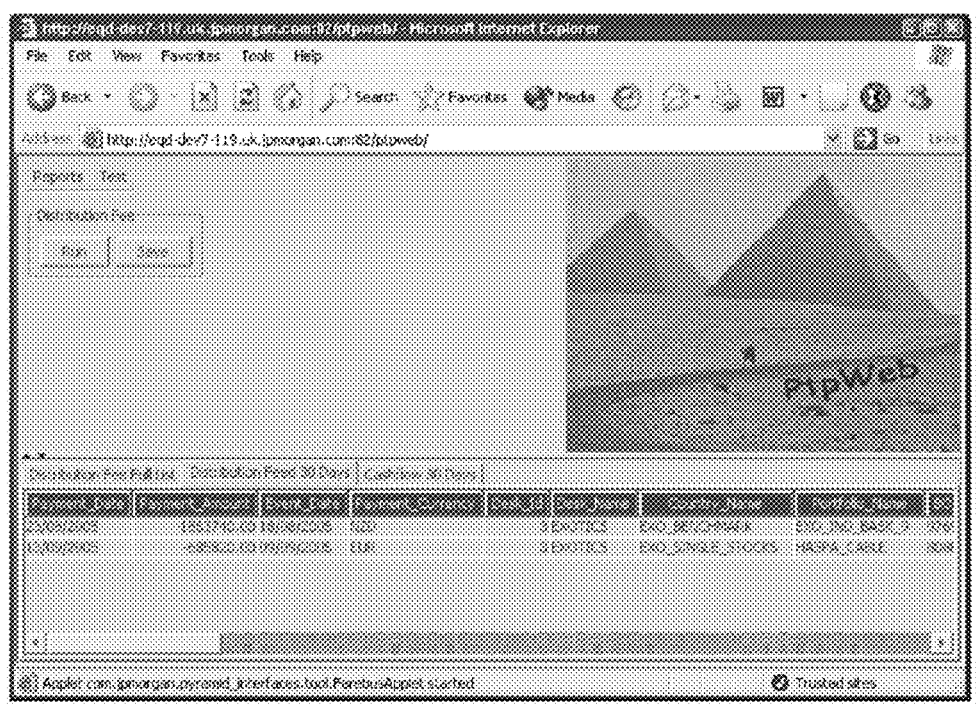
FIG. 13 is an exemplary screen shot of an interface for disseminating database information.

With reference to FIG. 12, there is shown a screen 1200 including a report having multiple result sets. With reference to FIG. 13, there is shown an interface screen 1300 displaying a report with three retuned result sets. A corresponding code portion 1400 is shown in FIG. 14.

Thus, embodiments of the invention provide for a front-end system for managing data feeds to a user from a database, and a database server back-end system that employs pre-defined scripts to obtain, format, and disseminate the information in the proper, desired format. The front-end system of the present invention is a front-end system that allows the user to more easily select information to be obtained, and to select the type and format of report to be generated. After the user enters in the requested information, the requested information is retrieved from the database server system and displayed in a desired format.

Figure 15:
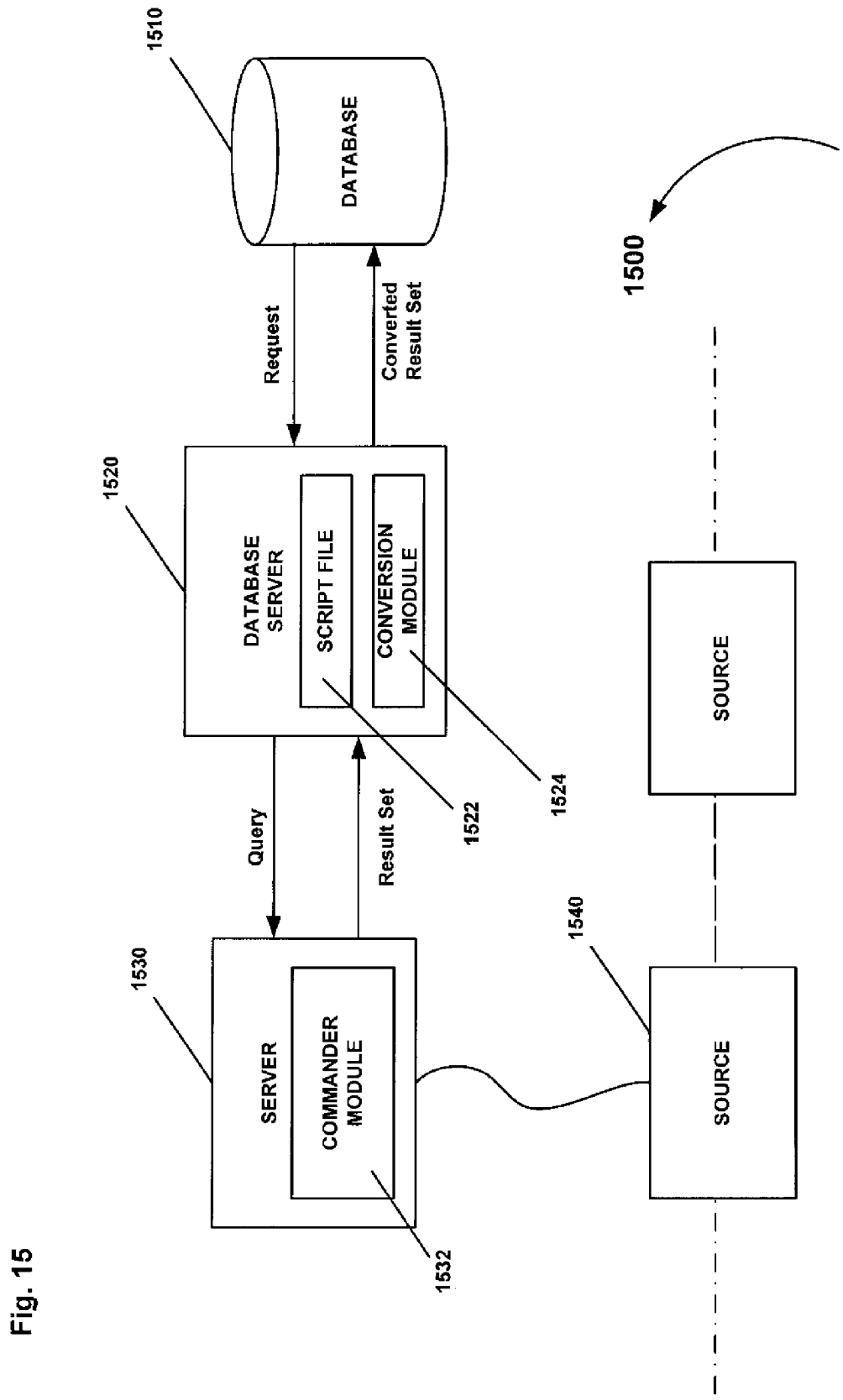
FIG. 15 is a high-level diagram of an exemplary system for loading information into a database.

Embodiments of the present invention include the system 1500, as illustrated in FIG. 15, for executing a file loading procedure. The procedure includes loading datafeeds/files into a database 1510 which includes a Database Server 1520 that executes a program for accessing a Script File 1522 to obtain instructions for searching, formatting and forwarding a data feed to the database 1510. Typically, the Script File 1522 contains a series of custom instructions written in a text-based script language. As an example, a Server 1530 might be instructed to access a particular file from a source 1540 to retrieve specified information and convert this information in a specific format to be loaded into the database 1510. The source 1540 may preferably be for example, a particular file on a file system or a particular queue in a messaging system. The script determines which source to use by the properties specified in table 11 below, which details for example the name of a file and also by the transport methods specified in table 4 above.

The Server 1530 is operatively coupled to the Database Server 1520 such that a plurality of predefined database commands (e.g., SQL commands) is executed. As depicted in FIG. 1, the Server 1530 includes a Commander Module 1532, for example, a SQL Commander, for selecting and executing a query against at least one source 1540, such as a user. When the Server 1530 is called, a request for a particular set of SQL commands is received and the Commander Module 1532 selects the pertinent query for the Source 1540. The Commander Module 1532 executes the predefined SQL statements, and returns a result set to the Server 1530. In turn, the Server 1530 returns the result set to the Database Server 1520.

Once the result set for the particular query is received, the Script File 1522 is again consulted to determine the format for the result set to be loaded into the database 1510. In general, the result set will be in a form that is readable to a user (such as an Excel spreadsheet file, Word file or a PDF file), yet not suitable to be loaded into the database 1510. The result set will be converted to a suitable format; an example of the format to be converted into to be loaded into the database would be plain text or XML. In one example, the database 1510 includes a set of tables into which the data from the result set needs to be loaded. Such data can be converted into a format suitable to be loaded into the tables in the database 1510. In order to convert the result set into the specified format, the Database Server 1520 calls a Conversion Module 1524 for this purpose. The Conversion Module 1524 could be an off-the-shelf module or one that is specially written. Preferably, the Conversion Module 1524 will be implemented in such a way that various different formats are supported and additional ones are easily added.

Even though FIG. 15 discloses two separate computerized servers, server 1530 and a database server 1520, it is obvious to one skilled in the art that one computerized server can also be used to perform the functions of both the server 1530 and the database server 1520.

Figure 16:
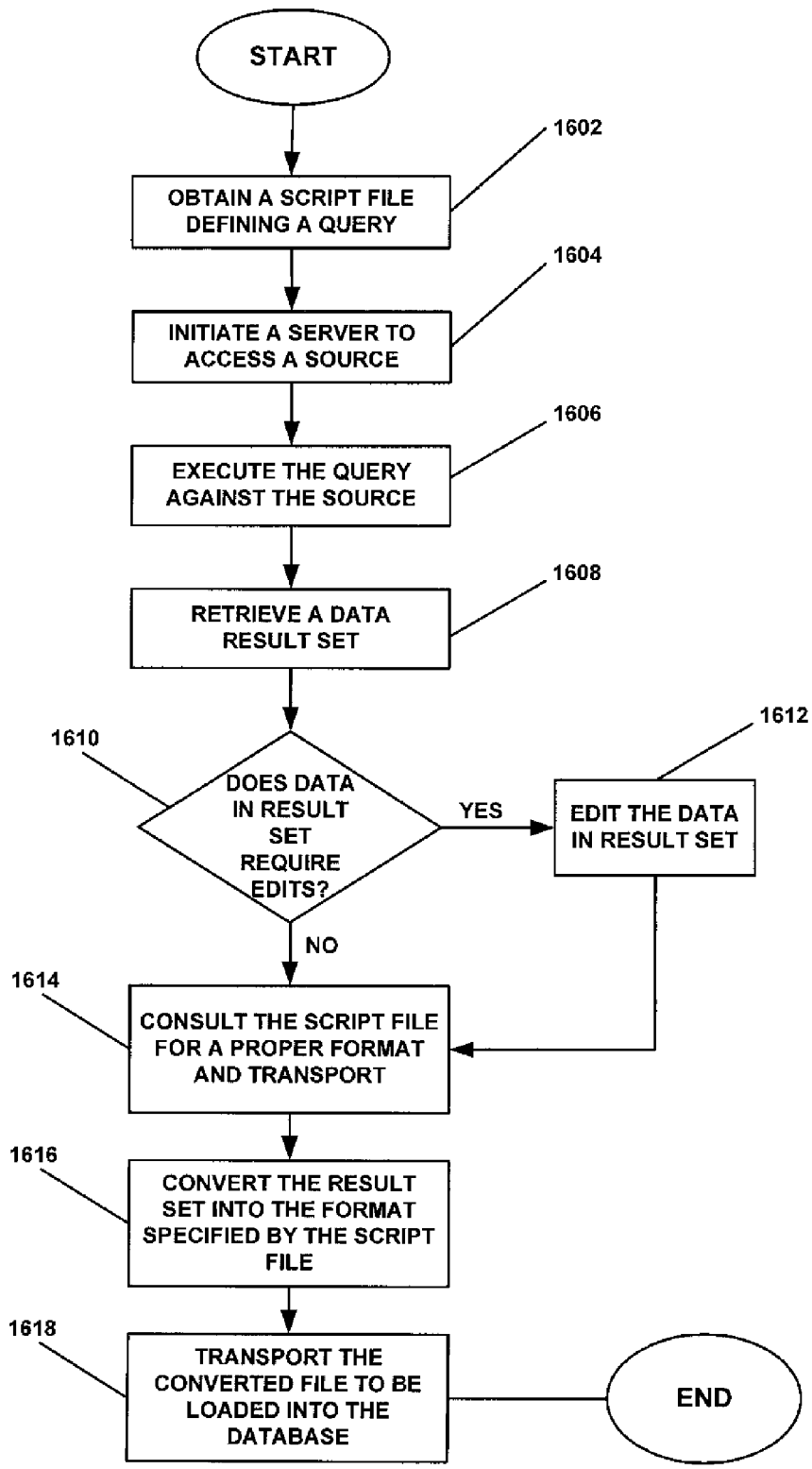
FIG. 16 is an exemplary flow chart outlining a method for loading information into a database.

Referring to FIG. 16, an exemplary method for loading information into the database is illustrated.

First, in step 1602, a script file 1522 is obtained to determine instructions for extracting, formatting and loading a data feed. As discussed above, the script file 1522 is preferably a JAVA properties file. The script file 1522 will typically include the name of the file to be extracted. Next, in step 1604, access to the source 1540 is established as described above, and a call to the server 1530 is initiated. The server 1530 will receive information regarding a set of SQL predefined commands to access. In step 1606, the server 1530 queries the datafeeds from different sources 1540 with the predefined SQL commands. In step 1608, a result set for the particular query is received.

Once the result set is available, the script file 1522 is consulted in step 1610 to determine if any editions are required in the result set received from the source. If no editions are required, then, the script file 1522 is again consulted for the proper format and transport/load method in step 1614. Then, in step 1616, a conversion module is called to format the result set into the proper format specified by the script file 1522. However, if in step 1610 it is determined that edits are required in the result set, then in step 1612, the data in the result set is edited before sending it on to be converted. Edits are rather ad-hoc in nature and done preferably via a 'plug-in' or system commands. As used herein, a plug-in is some very specific instructions written in a programming language such as Java and system commands are platform dependent instructions. Both of these are invoked from the script to manipulate the data in some way. For example, plug-ins currently used change month names to numbers (e.g. from Jan to 01), or combine two lines in a file together into one line. It is the script file that is being consulted if editions are required but the actual instructions are inside the plug-in. Finally, in step 1618, the converted file is transported to be loaded into the database 1510 indicated in the script file 1522, and processing ends.

Referring to FIG. 17, an exemplary script file 1522 is illustrated. The script file 1522 shown in FIG. 17 instructs the database Server 1520 to load a flat file called "FX_SPOT" into the Database 1510. The Server 1530 interfaces with the Database Server 1520 in order to accomplish the task. It is to be appreciated that the script file 1522 shown in FIG. 17 is provided for illustrative purposes.

As depicted in the example in FIG. 17, the script file 1522 appears as a series of commands in a text file to load the flat file, "FX_SPOT" via a stored procedure. The syntax for the Script File 1522 shown and discussed herein involves a syntax that is close to that of a JAVA properties file. However, it is to be appreciated that the script file could be written in another suitable language so long as it is capable of defining the way in which the data feed is to be extracted, formatted and loaded. However, the use of a JAVA properties file for this purpose is a preferred method of creating the Script File 1522.

As will be discussed in greater detail, the exemplary Script File 1522 shown in FIG. 17 sets forth each of the parameters needed by the Database Server 1520 to extract, format and deliver the data feed to be loaded into the Database 1510. Line 1 of this file is a comment since it starts with the number (#) sign. Line 2 defines the file name which in this example is "FX_SPOT". Line 3 defines the file name extension such as .txt or .xls, or as in this case, it is none. Line 4 defines if the file has a header line then the property 'FileHasHeader' should be set to true so that the stored procedure is not called for this line, otherwise, it should be set to false. Line 5 defines the procedure to call that is executed by the Database Server 150. Initially it calls a stored procedure 'kap_file_load', in line 5 and then it calls the stored procedure kap_fxrate_load' in line 6 for each line in the file. Only the columns 7 and 19 (in bold) will be passed as parameters to the stored procedure and all the other columns of data in the file will be ignored. The stored procedure 'kap_file_load' will be called again in line 7 once all the lines in the file have been loaded.

The properties can be used to load data from a file using a stored procedure call for each line in the file as shown in Table 10 below.

TABLE 10

| Property | Description | Values | Default |
|---|---|---|---|
| FileHasHeader | Indicated if the file has a header or not | Boolean | false |
| FileIgnoreLine | The line in the file will be ignored if it starts with the given text | String | null |
| FileIgnoreQuotes | If any column in the file is contained within the quote characters specified, then they will be removed | String | null |
| FileIgnoreQuotesCol<n> | If column <n> in the file is contained within the quote characters specified, then they will be removed | String | null |

TABLE 10-continued

| Property | Description | Values | Default |
| --- | --- | --- | --- |
| DateParameterFormat | The format of dates in the file which will be passed as parameters to a stored procedure when the file is loaded | Java Date Format String | yyyy-MM-dd |
| TimeParameterFormat | The format in which a date/time type is passed to a stored procedure | Java Format String | yyyy-MM-dd HH:mm |
| DateFormats | List of formats that may be returned by a command that contains the → <n> [,<n>] Syntax | Comma separated list of Java Format Strings | null |

File Name Configuration

The properties allow file names and their location to be specified as shown in Table 11 below.

TABLE 11

| Property | Description | Values | Default |
| --- | --- | --- | --- |
| FileName | The name of the file to be loaded or written | File name | null |
| FileExt | The file extension to be appended | String | null |
| ReportsDir | The directory where the file should be written (before/after transporting or copying to sent directory | Directory Path | Current directory |
| CompletionFileName | The name of a file to be sent after the feed file is sent | String | null |
| SentDirectory | The sub-directory in "ReportsDir" where the sent file is moved after transporting and adding any necessary date suffix | Directory name | SENT |
| ReceivedDirectory | The sub-directory in "ReportsDir" where the received file is moved after transporting and adding any necessary date suffix | Directory name | RECEIVED |
| DateSuffix | Is date to be appended when moved to SENT or RECEIVED directory | Boolean | true |
| SuffixDateFormat | The format of any date suffix to be appended | Date Format String | yyyyMMdd |
| LeaveReceivedFileCopy | Whether the file should be left in the "ReportsDir" directory and not moved to the "ReceivedDirectory" | Boolean | false (which implies that the file is moved) |
| UnixCopyCommand | The Unix command to be used to move the received file to the "Received Directory". Only applicable if the property "LeaveReceivedFileCopy" is set to true | Any Unix copy command and parameters | /usr/bin/cp |
| FileAlreadyExists | A file should not be created by the feed as it already exists | Boolean | false |

Date and Region Configuration

The properties allow the feed date and region to be configured as shown in Table 12 below.

TABLE 12

| Property | Description | Values | Default |
| --- | --- | --- | --- |
| TMinusOne | Changes the feed date to T − 1. Note this is T − 1 in calendar days not business days (see FeedDate) | Boolean | false |

TABLE 12-continued

| Property | Description | Values | Default |
| --- | --- | --- | --- |
| FeedDate | Changes the feed date to the given date. Note, this requires a call to the stored procedure erebus_get_feeddate | dt_bus_lst, dt_end_mth, dt_end_mth_fin | null |
| FileRegion | Populates %FEEDREGION% in the feed file name | String | null |
| FileDateFormat | Date format if %FEEDDATE% is included in the file name | Date Format String | yyyy-MM-dd |
| FeedDateFormat | Date format if %FEEDDATE% is included in sql or a stored proc parameter | Date Format String | yyyy-MM-dd |

Additionally, instead of loading data from a file by calling a stored procedure, an alternative and preferably faster method is to bulk load selected columns from the file into a temporary table and then use a stored procedure to manipulate the data in the temporary table. Although, not shown, similar functionality exists to load a file that is in XML format.

In a preferred embodiment of the present invention, a feature referred to herein as "Control Feeds" is added within the script, which could either be script 122 or script 1522. This allows for parts of the script to be executed multiple times using timers and loops and also allows the flow of control of the commands to be altered when an exception occurs. Examples of such exceptions are database deadlock, connection failure etc. In this embodiment, the database is preferably polled on a timer. So, if a timer is set, for example, for every ten minutes, then there would be a pause for ten minutes between multiple extractions of data over time. For example, the sequence could be as follows: extract data, transport it, wait for 10 minutes and then repeat the sequence. Similarly, in the reverse procedure, there would be a pause between extracting the information from the source and then performing the task of transporting to be loaded into the database. In another example, during the process of extracting information from the database or loading the information into the database, if a database connection failure or a deadlock is detected, the script then defines the instructions and/or steps to take as a reaction to that failure. As known to one skilled in the art, a deadlock is a condition that can arise in a database. For example, a deadlock is where a first process has locked resource A and is waiting to lock another resource B, but at the same time a second process has locked the resource B and is waiting to lock the resource A. This way, the two processes will wait forever (which is a deadlock) and most databases in the prior art detect these and delete one of the processes involved. The present invention however allows for the deadlock to be handled by allowing instructions in the script which describe what to do if a deadlock (or connection failure, or other similar event) is detected. The steps may preferably include a re-run of the command to attempt to reconnect to the database at a later time or to call another part of the script. By calling another part of the script, another chain of instructions in that script file is invoked. A script file may contain a number of separate sets of instructions. Some sets of instructions will never be invoked unless a specific set of circumstances arises. For example, if a set of instructions is being executed and an exception happens (such as a database connection is lost) then a property with the name 'RunOnException' will be looked for and the set of instructions specified there will be run. For example:

ErebusFeed.FeedNames=MainFeed
ErebusFeed.MainFeedType=Connection
ErebusFeed.ExceptionHandlerType=FlatFile
.MainFeed.sq1_to_call1={call load data( )}
.ExceptionHandler.sq1_to_call1={call flag_error([IN;12;% LASTEXCEPTION%])}
MainFeed.RunOnException=ExceptionHandler In normal circumstances the instructions defined by 'MainFeed' will be the only ones executed, but if an exception happens, then the instructions defined by 'ExceptionHandler' will be executed. So, in other words, the control feeds controls the flow of the data such as to when to extract information from the database or load information into the database and based on the running condition of the script, decide on whether to transport that information if some error occurs.

Exemplary properties that control the flow of the feeds and output to the log files are shown in Table 6 below.

TABLE 6

| Property | Description | Values | Default |
| --- | --- | --- | --- |
| FeedDisabled | When set the true the feed will terminate immediately it is started | Boolean | false |
| HeartBeatMessage | Heart beat message to be output in order to provide continuing updates to the log file | String | null |
| HeartBeatInterval | Number of seconds between output of each heart beat message | Integer | 3600 |
| SystemProperties | System properties to be output to the log file | Space Separated List | user.name os.version java.home java.class.path |
| CallSqlOnStartup | Call the 'sql_to_call<n>' when the feeds starts. If set the false they will need to be called from another feed | Boolean | true |

TABLE 6-continued

| Property | Description | Values | Default |
|---|---|---|---|
| SQLLoopTimer | Continually perform the SQL in a loop at the specified interval (in seconds) | Integer | 0 |
| SQLLoopSkip | When performing SQL in loop on SQLLoopTimer skip the specified SQL | Comma separated list of SQL indexes | null |
| SQLLoopBackoffIf | If the property value appears anywhere in output from a stored procedure print statement, then the SQLLoopTimer value will be increased by the 'By' property, up to the 'Limit' property below | String | null |
| SQLLoopBackoffBy | Amount to increase the SQLLoopTimer value by if SQLLoopBackoffIf values appears in stored procedure print output | Integer | 0 |
| SQLLoopBackoffLimit | Limit of increase for SQLLoopTimer. May take the form or one of more "<limit> from HH:MM" items to specify limits for time periods | Integer or comma separated list | 0 |
| FeedLoopTimer | Continually perform the feeds in a loop at the specified interval (in seconds) | Integer | 0 |
| ContinueOnSQLException | If an exception occurs in SQL or a stored procedure further SQL to call will not be performed unless this property is set to true | Boolean | false |
| ContinueSQLLoopOnSQLException | Setting this property to true will continue with any SQLLoop when an exception occurs in SQL or a stored procedure | Boolean | false |
| ContinueOnException | If multiple feeds are invoked then if an exception occurs further feeds will not be started unless this property is set to true | Boolean | false |
| ContinueOnExceptionIn<feed> | If an exception occurs in feed <feed> further feeds will not be started unless this property is set to true | Boolean | false |
| RunOnException | List of feeds to run when an exception is encountered | Space Separated List | null |
| RunOnExceptionIn<feed> | List of feeds to run when an exception is encountered in feed <feed> | Space Separated List | null |
| RunOnDeadlockException | List of feeds to run when an deadlock exception is encountered | Space Separated List | null |
| RunOnDeadlockExceptionIn<feed> | List of feeds to run when an deadlock exception is encountered in feed <feed> | Space Separated List | null |
| RunOnConnectionException | List of feeds to run when an connection failure exception is encountered | Space Separated List | null |
| RunOnConnectionExceptionIn<feed> | List of feeds to run when an connection failure exception is encountered in feed <feed> | Space Separated List | null |
| RunOnSQLException | List of feeds to run when an SQL exception is encountered | Space Separated List | null |
| RunOnSQLExceptionIn<feed> | List of feeds to run when an SQL exception is encountered in feed <feed> | Space Separated List | null |
| RunOnJMSException | List of feeds to run when a JMS exception is encountered | Space Separated List | null |
| RunOnJMSExceptionIn<feed> | List of feeds to run when a JMS exception is encountered in feed <feed> | Space Separated List | null |

TABLE 6-continued

| Property | Description | Values | Default |
| --- | --- | --- | --- |
| RunOnRaiseError<error> | List of feeds to run when a "raiseerror" is called from a stored procedure with error id <error> | Space Separated List | null |
| ContinueFeedAfterRunOnException | Continue the feed that gave the exception after any feeds to be run on exception have completed. Otherwise the feed that gave the exception is stopped. | Boolean | false |
| ReportRunOnExceptionAs | How the exception that resulted in feeds being run on that exception is reported. If not specified then by default all linked exceptions are reported. If specified the actual exception is reported as required. | exception, warning, information, ignore | null |
| ContinueOnFileLoadException | Continue to load a file even if an error occurs loading a line because there are not the expected number of columns | Boolean | false |
| LogResults | If set to true the result sets from SQL called will be written to the log file | Boolean | false |
| LogResultsFor<feed> | If set to true the result sets from SQL called by the feed <feed> will be written to the log file | Boolean | false |
| LogMaxLineLength | If set to greater than zero then any log output line longer than the value will be truncated | Integer | 0 |
| SingleInstancePort | Set to an agreed/allocated port to restrict a feed to only one instance running at the one time. | Integer | 0 |
| SingleInstanceReplace | If an existing instance is running already, then the new instance will kill the old instance effectively replacing it. | Boolean | false |

In another preferred embodiment of the invention, a feature referred to herein as "Schedule Feeds," is added to either the script 122 or 1522. This allows any part of the script or any feed within the script to be given or identified by a date and a time associated with it. It is similar to control feeds except that instead of being controlled on a time, it is being controlled from within the feed itself. So, it provides for a scheduler to execute commands for the feed rather than it running on a certain time or falling in a particular interval. This gives the ability to allow a test harness to be built for a specific script so that script itself can be used to run other scripts as kind of a test. As is known to those skilled in the art, a test harness is a way of invoking scripts in a controlled way so as to test that they perform as expected. Ideally, if any of the scripts was changed, then the test harness could be run in order to ensure that everything still worked as expected. Further, instead of scheduling using the operating system scheduler, one can use a scheduler within a scripting engine or that location itself and the application that is running the script will also have a scheduler built into it. So inside the script file, various jobs/commands can be scheduled to run at different times.

The 'Schedule feed" allows a feed to be run immediately or at a pre-determined date and time either inside the same process as the Scheduled feed, or invoked as an external process. Any number of individual feeds can be specified in the Scheduler properties file in the script. An individual feed can be scheduled using a property with the following form:

Schedule<name>=<when>EXEC|API<feed>
where <name> is a unique name for the feed
   <when> is a date/time, or 'Now')
   <feed> is either a command or feed parameters Any number of lines as shown above may appear in order to schedule feeds. Each name should be unique to the script. The <when> field indicates the date and the time that the feed should be scheduled for; or 'Now" if it is to be scheduled immediately. EXEC implies the feed should be invoked as an external process and API invoked within the same process as the Schedule feed. The parameters are explained in more detail below.

A command would take the usual form "<Feed Name><Region><Options>". Note the use of the \ character to split the property over multiple lines. The feed parameters required would be as follows (in no particular order) plus any other parameters as necessary:
   f<feed name>\
   r<region>\
   property UserPropertiesFile=properties/<filename>properties \
   property UserPropertiesDir=<path to UserPropertiesFile>

The feed name is a unique name for the feed and may be the same or different to the name next to 'Schedule'. Region is an instance indicator. The properties UserPropertiesDir and UserPropertiesFile provide the location and the file name of the script being scheduled.

As discussed above, one of the main purpose of the 'Scheduler' feed type is to provide an easy way to run feeds as part of a regression test harness. An example of a script file 1800 as part of a test harness is illustrated in FIG. 18. It consists of two feeds, a set up feed which simply creates an output directory for the feed files and the scheduler itself. The two feeds form the test harness. The first one isn't testing anything however, it is simply performing initial set up required in order that the tests can be run; in this case, it is creating a folder that contains the date. The second feed is the scheduler itself, which will perform the list of scheduled scripts specified in_the script file. The parameter '-x' is specified in the script file (as a default, rather than being passed into the feed) in order to define a set of defaults such as no transport method, the location of all the script files within the file system and the reports directory created in the set up feed. It is inserted into the parameter list of the individual feeds by "%-x %". Any of these scripts can be overwritten by the individual feeds (for example the Standard Trade feed uses a script file in user's own properties directory rather than in the one specified in the set of defaults. Other parameters can be passed into the feeds (for example—pESW in the Hedge Funds feed). All the feeds are run via the application programming interface (API) and only one log file is produced which will require to be checked for any exceptions, and all output files will be written to one directory.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-implemented method for managing a plurality of data feeds to be loaded into a database using a processor comprising the steps of:
   obtaining a script using a server, the script for specifying a source including a name of a file to be extracted and a query stored in a database server;
   executing the query using a computerized commander module in said database server against the source containing the named file to extract a result set;
   transferring the result set from the server to the database server, wherein the result set is in a user readable format requiring conversion;
   consulting the script to determine a format for the data feed to be loaded into the database, the script comprising a series of commands in a text file and setting forth each of the parameters needed by the database server to extract, format, and deliver the result set as a file to be loaded into the database;
   converting the result set using the computerized conversion module in accordance with the format to create the data feed; and
   transporting the data feed to be loaded into the database specified by the script.

2. The method of claim 1 further comprising consulting the script if data in said result set is to be edited.

3. The method of claim 2 further comprising editing said data in the result set prior to the converting.

4. The method of claim 1, further comprising consulting said script to specify said source.

5. The method of claim 4, wherein the query is referenced as a stored procedure that executes SQL commands against the specified source.

6. The method of claim 1 wherein said source is a specific file in a file system.

7. The method of claim 1 wherein said source is a specific queue in a messaging system.

8. The method of claim 1, wherein the script is stored as a text file.

9. The method of claim 1, wherein the result set is one of a text file, a flat file, a spreadsheet file, an HTML file, an XML file, and a PDF file.

10. The method of claim 1, wherein the result set is extracted as a transport method of one of electronic mail (e-mail), FTP, and JVS.

11. The method of claim 1, wherein the format specifies one or more format type options required for loading the data feed into the database.

12. The method of claim 1 further comprising controlling at least a portion of said script.

13. The method of claim 12 wherein said controlling comprises executing said script at a specific schedule.

14. The method of claim 12 wherein said controlling comprises executing said script multiple times at a specified interval.

15. The method of claim 1 wherein said script comprise a first set of instructions.

16. The method of claim 15 wherein said first set of instructions comprises repeat steps (a) through (e) for said query at a later time.

17. The method of claim 15 wherein said first set of instructions comprises halting the transporting of the data feed upon detection of a failure.

18. The method of claim 15 wherein said first set of instructions comprises invoking a second set of instructions in said script.

19. A system for managing a plurality of data feeds to be loaded into a database comprising:
   a processor;
   a server coupled to a database server for obtaining a script, the script for specifying a source including a name of a file to be extracted and a query;
   said server comprising a commander module for executing the query against the source containing the named file to extract a result set and transferring the result set from the server to the database server, wherein the result set is in a user readable format requiring conversion;
   said database server consulting the script to determine a format for the data feed to be loaded into the database, the script comprising a series of commands in a text file and setting forth each of the parameters needed by the database server to extract, format, and deliver the result set as a file to be loaded into the database;
   said database server comprising a conversion module for converting the result set in accordance with the format to create the data feed; and
   said database server transporting the data feed to be loaded into the database specified by the script.

* * * * *

UNITED STATES PATENT AND TRADEMARK OFFICE
CERTIFICATE OF CORRECTION

PATENT NO. : 9,734,222 B1
APPLICATION NO. : 12/364632
DATED : August 15, 2017
INVENTOR(S) : Kenneth T. Milne Page 1 of 1

It is certified that error appears in the above-identified patent and that said Letters Patent is hereby corrected as shown below:

In the Specification

In Column 1, Lines 8-9:
"This application is a Continuation-In-Part of U.S. patent application Ser. No. 11/266,949, filed Nov. 5, 2005"
Should read:
-- This application is a Continuation-In-Part of U.S. Patent Application Ser. No. 11/266,949, filed November 4, 2005 --.

Signed and Sealed this
Twelfth Day of February, 2019

Andrei Iancu
*Director of the United States Patent and Trademark Office*